(12) United States Patent
Jankowski et al.

(10) Patent No.: US 9,025,766 B2
(45) Date of Patent: May 5, 2015

(54) EFFICIENT HARDWARE ARCHITECTURE FOR A S1 S-BOX IN A ZUC CIPHER

(71) Applicants: Krzysztof Jankowski, Folsom, CA (US); Gunnar Gaubatz, San Jose, CA (US)

(72) Inventors: Krzysztof Jankowski, Folsom, CA (US); Gunnar Gaubatz, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 13/798,528

(22) Filed: Mar. 13, 2013

(65) Prior Publication Data

US 2014/0270152 A1 Sep. 18, 2014

(51) Int. Cl.
*H04L 9/06* (2006.01)
*H04L 9/22* (2006.01)
*G09C 1/00* (2006.01)

(52) U.S. Cl.
CPC *H04L 9/065* (2013.01); *G09C 1/00* (2013.01); *H04L 9/0662* (2013.01); *H04L 2209/122* (2013.01)

(58) Field of Classification Search
None
See application file for complete search history.

(56) References Cited

U.S. PATENT DOCUMENTS

| | | | | |
|---|---|---|---|---|
| 6,279,023 | B1* | 8/2001 | Weng et al. | 708/492 |
| 2006/0093136 | A1* | 5/2006 | Zhang et al. | 380/29 |
| 2010/0306299 | A1* | 12/2010 | Reidenbach | 708/492 |
| 2012/0278622 | A1* | 11/2012 | Lesavich et al. | 713/168 |

OTHER PUBLICATIONS

Kitsos, PAris Sklavos, Nicolas Skodras, Athanassios an FPGA Implementation of the ZUC Stream Cipher. 2011 14th Euromicro Conference on Digital System Design [online], Aug. 31, 2011-Sep. 2, 2011 [retrieved on Sep. 20, 2011]. Retrieved from the Internet: <URL:http://ieeexplore.ieee.org/xpls/abs_all.jsp?arnumber=6037494&tag=1 >.*
ETSI/SAGE Specification of the 3GPP Confidentiality and Integrity Algorithms 128-EEA3 & 128-EIA3. Document 2: ZUC Specification [online], Jun. 28, 2011 [retrieved on Sep. 20, 2014]. Retrieved from the Internet: < URL: http://www.gsma.com/technicalprojects/wp-content/uploads/2012/04/eea3eia3zucv16.pdf >.*

* cited by examiner

*Primary Examiner* — Gilberto Barron, Jr.
*Assistant Examiner* — Malcolm Cribbs
(74) *Attorney, Agent, or Firm* — Lowenstein Sandler LLP

(57) ABSTRACT

Efficient hardware architecture for a S1 S-box for a ZUC cipher is described. One circuit includes a first circuit to map an 8-bit input data of a Galois field GF(256) for a 8-bit data path for a ZUC cipher non-linear function component into 4-bit data paths for the ZUC cipher non-linear function component. The circuit further includes other circuits coupled to the first circuit to execute the 4-bit data paths in $GF(16^2)$ to determine the inverse of the 8-bit input data for the ZUC cipher non-linear function component in $GF(16^2)$ and to map the inverse in $GF(16^2)$ to the Galois field GF(256).

25 Claims, 7 Drawing Sheets

EFFICIENT HARDWARE ARCHITECTURE FOR A S1 S-BOX IN A ZUC CIPHER

TECHNICAL FIELD

Embodiments described herein generally relate to processing devices and, more specifically, relate to efficient hardware architecture for a S-1 S-box in a ZUC cipher.

BACKGROUND

The ZUC cipher is an algorithm developed by the Chinese Academy of Sciences for LTE (long term evolution) wireless access cipher algorithms. The ZUC cipher is a word-oriented stream cipher that takes a 128-bit initial key and a 128-bit initial vector as input, and outputs a key stream of 32-bit words. The key stream can be used for encryption/decryption. The ZUC cipher core is built upon three components: (1) a linear feedback shift register, (2) a bit reorganization layer, and (3) a non-linear function layer.

The nonlinear function involves finding the inverse of an 8-bit number, considered as an element of the Galois field $GF(2^8)$. The Galois inverse is not a simple calculation, and so many current implementations use a lookup table of an S-box (substitution box) function output. A S-box takes a byte input and maps the byte input to a byte output. Typically, the ZUC cipher algorithm includes two S-boxes, S0 and S1. S1 is generally a 256-byte lookup table, where the inputs are mapped to outputs in the lookup table. The table look-up method may be fast and easy to implement, but for hardware implementations of ZUC, the lookup table can involve a significant allocation of hardware resources. Traditional implementations of the S1 S-Box generally use much physical space, which may be costly and not suitable for high speed VLSI (very large scale integration) circuit designs.

DESCRIPTION OF EMBODIMENTS

Technologies for a S1 S-box (substitution box) for a ZUC cipher are described. The ZUC cipher is an algorithm for LTE (long term evolution) wireless access. The ZUC cipher is a word-oriented stream cipher that takes a 128-bit initial key and a 128-bit initial vector as input, and outputs a key stream of 32-bit words. The key stream can be used for encryption/decryption. The ZUC cipher core is built upon three components: (1) a linear feedback shift register, (2) a bit reorganization layer, and (3) a non-linear function layer. The nonlinear function includes two S-boxes, S0 and S1. The S1 S-box involves finding the inverse of the 8-bit (one byte) number, considered as an element of the Galois field $GF(2^8)$. The S1 S-Box is traditionally a 256-byte lookup table, where the inputs are mapped to outputs in the lookup table. The traditional S1 S-box lookup table solution generally takes up much physical space and uses a significant amount of hardware resources.

Embodiments determine an inverse of an 8-bit input for a ZUC cipher using a direct mapping. Embodiments provide a physically compact solution for implementing a ZUC S1 S-box. Embodiments create a S1 S-box that is significantly smaller in physical area than a traditional S-box lookup table solution. Embodiments can represent the ZUC S1 S-box as a function containing logical equations, that when implemented, are more compact in RTL (Register Transfer Level) implementations. RTL is a design abstraction method used in hardware description languages. Embodiments replace a traditional ZUC S1 S-box lookup table with an efficient hardware implementation that uses calculations to perform a directing mapping of one input to one output. Embodiments determine a direct calculation of the S-box function using sub-field arithmetic, having an advantage that the circuitry for the various embodiments is relatively simple, in terms of the number of logic gates that can be used.

Figure 1:
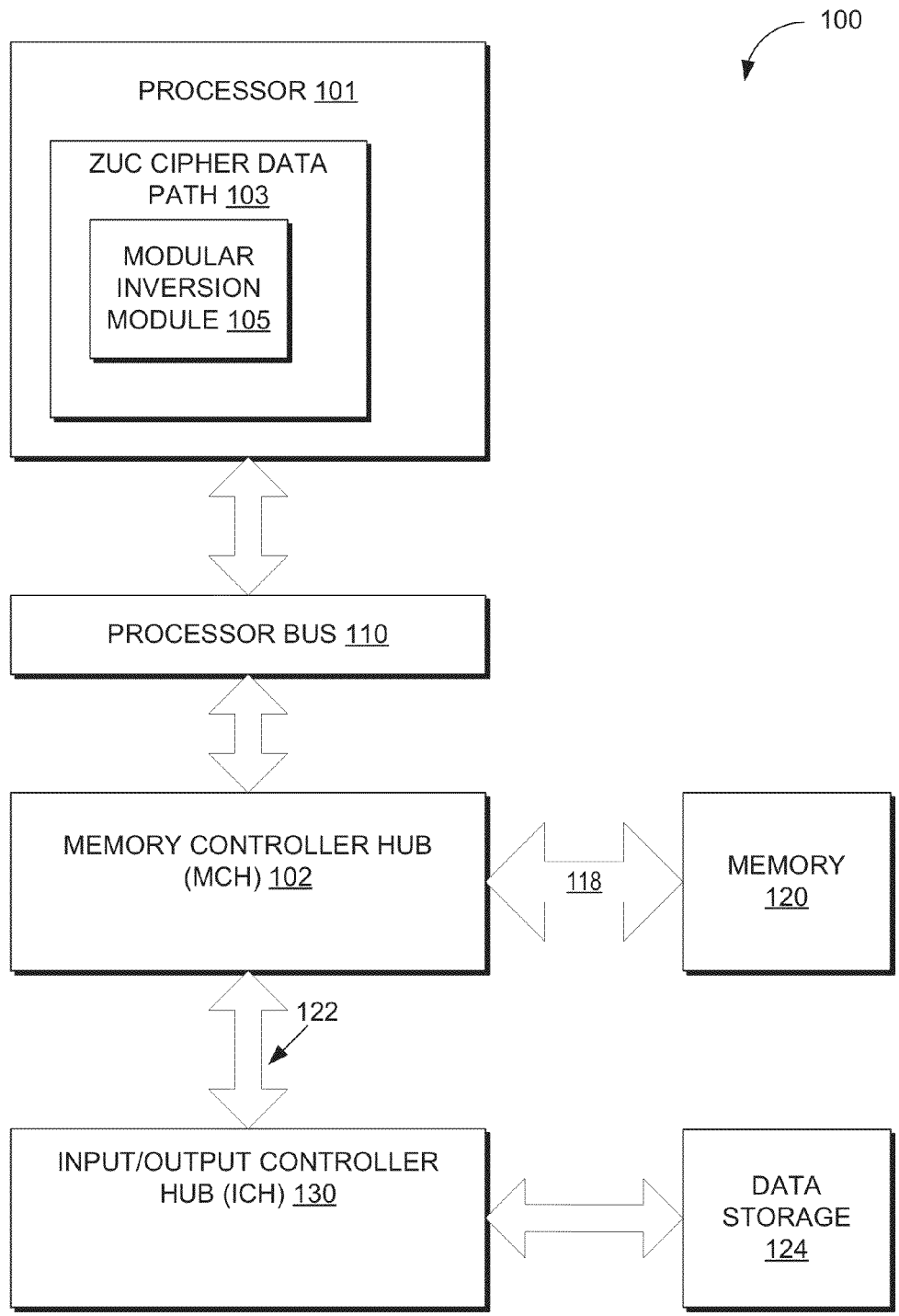
FIG. 1 is a block diagram of one embodiment of a system that includes a ZUC cipher data path for performing ZUC cipher encrypt or description operation in a general purpose processor.

Turning to FIG. 1, a block diagram of an exemplary computer system formed with a processor that includes execution units to execute an instruction, where one or more of the interconnects implement one or more features in accordance with one embodiment of the present invention is illustrated. System 100 includes a component, such as a processor 101 to employ execution units including logic to perform algorithms for process data, in accordance with the present invention, such as in the embodiment described herein. System 100 is representative of processing systems based on the PENTIUM III™, PENTIUM 4™ Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments of the present invention can be used in handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 101 includes one or more execution units to implement an algorithm that is to perform at least one instruction. One embodiment may be described in the context of a single processor desktop or server system, but alternative embodiments may be included in a multiprocessor system. System 100 is an example of a 'hub' system architecture. The processor 101, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 101 is coupled to a processor bus 110 that transmits data signals between the processor 101 and other components in the system 100.

Memory 120 includes a dynamic random access memory (DRAM) device, a static random access memory (SRAM) device, flash memory device, or other memory device. Memory 120 stores instructions and/or data represented by data signals that are to be executed by the processor 101.

A system logic chip 102 is coupled to the processor bus 110 and memory 120. The system logic chip 102 in the illustrated embodiment is a memory controller hub (MCH). The processor 101 can communicate to the MCH 102 via a processor bus 110. The MCH 102 provides a high bandwidth memory path 118 to memory 120 for instruction and data storage and for storage of graphics commands, data and textures. The MCH 102 is to direct data signals between the processor 101, memory 120, and other components in the system 100 and to bridge the data signals between processor bus 110, memory 120, and system I/O bus 122.

System 100 uses a proprietary hub interface bus 122 to couple the MCH 102 to the I/O controller hub (ICH) 130. The ICH 130 provides direct connections to some I/O devices via a local I/O bus. The local I/O bus is a high-speed I/O bus for connecting peripherals (e.g., data storage device 124) to the memory 120, chipset, and processor 101. The data storage device 124 can comprise a hard disk drive, a floppy disk drive, a CD-ROM device, a flash memory device, or other mass storage device.

The processor 101 can include a ZUC cipher data path 103 built upon three components: (1) a linear feedback shift register, (2) a bit reorganization layer, and (3) a non-linear function layer. The non-linear function layer includes two S-boxes, S0 and S1. The S1 S-box involves finding the inverse of the 8-bit (one byte) number, considered as an element of the Galois field $GF(2^8)$. The S1 S-box uses an inversion in the field of $GF(2^8)$ coupled with an affine transformation. An affine transform can be defined as $y=Ax+b$, where A is a binary matrix and b is a byte represented as a vector. In the ZUC algorithm, the underlying $GF(2^8)$ finite field is defined by the binary polynomial $p(x)=x^8+x^7+x^3+x+1$. The binary polynomial is an irreducible polynomial. For the ZUC algorithm, the binary matrix A is $$A = \begin{bmatrix} 0 & 1 & 1 & 1 & 1 & 0 & 0 & 1 \\ 1 & 0 & 1 & 1 & 1 & 1 & 0 & 0 \\ 1 & 1 & 0 & 1 & 0 & 1 & 1 & 0 \\ 1 & 1 & 1 & 0 & 0 & 0 & 1 & 1 \\ 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \end{bmatrix} \qquad \text{Diagram 1}$$

For the ZUC algorithm, the vector b is 0x55 (hexadecimal or short "hex"). The binary representation for b is 0101010101. The affine transform $y=Ax+b$ for the ZUC cipher is $$y = \begin{bmatrix} 0 & 1 & 1 & 1 & 1 & 0 & 0 & 1 \\ 1 & 0 & 1 & 1 & 1 & 1 & 0 & 0 \\ 1 & 1 & 0 & 1 & 0 & 1 & 1 & 0 \\ 1 & 1 & 1 & 0 & 0 & 0 & 1 & 1 \\ 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \end{bmatrix} \cdot x^{-1} \oplus \begin{bmatrix} 0 \\ 1 \\ 0 \\ 1 \\ 0 \\ 1 \\ 0 \\ 1 \end{bmatrix} \qquad \text{Diagram 2}$$

where $x^{-1}$ is the inversion that is determined by a modular inversion module 105 in the ZUC cipher data path 103.

The processor 101 can include a modular inversion module 105 to determine the $x^{-1}$ inversion using calculations to perform a directing mapping of one 8-bit (one byte) input to one 8-bit (one byte) output using sub-field arithmetic. The advantage is that the circuitry for the various embodiments for using calculations to perform a direct mapping of one 8-bit input to one 8-bit output is relatively simple, in terms of the number of logic gates that can be used.

Figure 2:
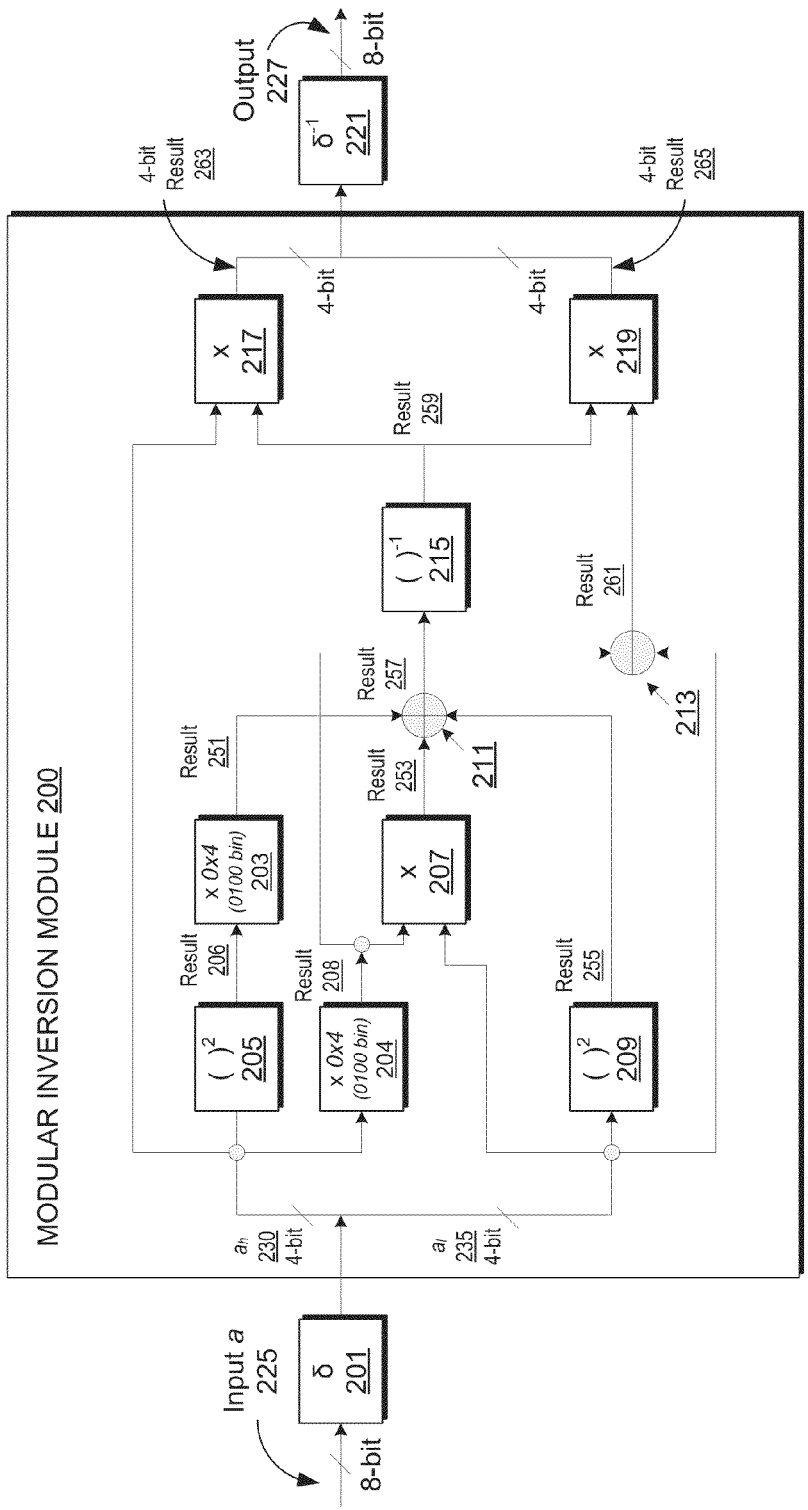
FIG. 2 is a block diagram of one embodiment for performing an inversion in GF(16) for one byte (8-bits) in the ZUC cipher data path.

FIG. 2 is a block diagram illustrating an embodiment of a modular inversion module 200 for performing an inversion in $GF(2^8)$ for an input of 8-bits in the ZUC cipher data path. The modular inversion module 200 can include circuitry for performing, for example, and not limited to, forward isomorphism, inverse isomorphism, GF(16) multiplication, GF(16) multiplication by a constant, squaring in GF(16), 4-bit bitwise exclusive-OR operations, inversion in GF(16), etc.

The modular inversion module 200 can receive input of an element a 225 in GF(256), which may be represented as either 8-bits (one byte) or as a polynomial of degree less than 8 over GF(2). The modular inversion module 200 can map the 8-bit input a 225 to two separate 4-bit data paths, compute results using 4-bit per operands, and recombine the results to create an equivalent 8-bit output 227. The modular inversion module 200 can map the 8-bit input a 225 to two separate 4-bit data paths using a composite field implementation of $GF(2^8)$. A composite field representation of a finite field is a mapping from the original field to an extension of a smaller subfield, such as, for example, the mapping from the original field $GF(2^8)$ to $GF(16)^2$. The mathematical term for the mapping from the original field $GF(2^8)$ to $GF(16)^2$ is an isomorphism, which can be performed if the original field has a composite degree. The modular inversion module 200 can apply isomorphism to original field $GF(2^8)$ since "4" properly divides "8". Each field extension can be defined by an irreducible polynomial. The modular inversion module 200 can use the following irreducible polynomials for the original field GF(256), the composite field $GF(16)^2$, and the subfield GF(16) for the ZUC algorithm.

The modular inversion module 200 can define the original field GF(256) by a degree eight irreducible polynomial:

$$P_{ZUC}(x)=x^8+x^7+x^3+x+1 \qquad \text{Equation 1}$$

The composite field $GF(16^2)$ can include a subfield GF(16) that is defined by an irreducible polynomial over GF(2):

$$P_{Sub}(x)=x^4+x+1 \qquad \text{Equation 2}$$

The degree two extension can be defined by an irreducible polynomial over GF(16):

$$P_{Comp}(y)=y^2+Ay+B \qquad \text{Equation 3}$$

where the coefficient constants A and B refer to elements in GF(16) represented by bit strings. For example, A=4 and B=4. The coefficient constant "4" which is a hex value 0x4 that can have a binary representation of the bit string "0100". The binary representation of the hex value 0x4 can also be shown as $\{0100\}_2$. Thus, the coefficient constant B=4=hex value 0x4=binary representation $\{0100\}_2$=polynomial representation $\alpha^2$, where $\alpha$ is a generator of the field (an element whose powers generate all other non-zero elements).

The composite field representation $P_{Comp}(y)=y^2+Ay+B$ can have different values for coefficient constants A and B, which can create various hardware implementations. The modular inversion module can include circuitry to implement functions for different values for constant coefficients A and B. Table 1 below illustrates various A and B coefficient values that can be supported by various circuitry in various embodiments of the module inversion module.

TABLE 1

| AB Coefficients |
|---|
| 44 |
| 3b |
| 2e |
| 6b |
| 62 |
| 72 |
| 44 |
| be |
| 19 |

For example, the modular inversion module 200 in FIG. 2 uses coefficient constants A=4 and B=4. The modular inversion module 200 can include circuitry for implementing two multipliers (e.g., multipliers 203,204). Each multiplier can perform a bit-wise multiplication operation by B=4 (e.g., hex value 0x4, binary value $\{0100\}_2$). Embodiments of a modular inversion module having circuitry to support coefficient constants A=1 and B=9 are described in greater detail below in conjunction with FIG. 3 and FIG. 4.

Returning to FIG. 2, the input a 225 is an 8-bit element in GF(256) and is represented as a polynomial of degree less than eight with coefficients from GF(2) (bit vector a[7:0]):

$$a(x)=a_7x^7+a_6x^6+a_5x^5+a_4x^4+a_3x^3+a_2x^2+a_1x+a_0 \quad \text{Equation 4}$$

The elements in GF(16) can be represented as a polynomials of degree less than four with coefficients from GF(2) (bit vector a[3:0]):

$$a(x)=a_3x^3+a_2x^2+a_1x+a_0 \quad \text{Equation 5}$$

The composite field elements in $GF(16^2)$ can be represented as a binomial, where each coefficient is from GF(16). In hardware, an 8-bit bit string can be two concatenated 4-bitstrings:

$$a(y)=(a_7x^3+a_6x^2+a_5x+a_4)*y+(a_3x^3+a_2x^2+a_1x+a_0)= a_h*y+a_l \quad \text{Equation 6}$$

With the field definition defined using Equations 1-6, the modular inversion module 200 can determine the inversion operation "$x^{-1}$" using direct inversion. The inverse of a field element a is an element b such that a*b=1. In the composite field "$a=a_hy+a_l$, and $b=b_hy+b_l$", therefore:

$$ab=(a_hy+a_l)(b_hy+b_l)=(a_hb_l+a_lb_h+a_hb_h)(a_lb_l+9a_hb_h)=1 \quad \text{Equation 7}$$

with the variables in GF(16). Equation 7 can be reorganized into a linear system of equations and solving for $b_h$ and $b_l$ gives:

$$b_l=(a_l+a_h)\Delta^{-1} \text{ and } b_h=a_h\Delta^{-1} \quad \text{Equation 8}$$

The individual bits in a byte representing a $GF(2^8)$ element can be viewed as coefficients to each power term in the $GF(2^8)$ polynomial. For instance, $\{10001011\}2$ represents the polynomial $q_7+q_3+q+1$ in $GF(2^8)$. Any polynomial can be represented as $a_hx+a_l$, given an irreducible polynomial of $x^2+Ax+B$. Thus, element in $GF(2^8)$ may be represented as $a_hx+a_l$ where $a_h$ is the most significant nibble while $a_l$ is the least significant nibble. From here, the multiplicative inverse can be computed using the Equation 9 below.

$$\Delta=a_l^2+a_la_hA+Ba_h^2 \quad \text{Equation 9}$$

The field $GF(2^8)$ is an extension of the field $GF(2^4)$. Therefore, each element, a, in $GF(2^8)$ may be represented as a polynomial of the form $a_hx+a_l$ in $GF(2^4)$. Thus, the inversion in $GF(2^8)$ can be realized by polynomial inversion in $GF(2^4)$ as follows:

$$a(x)^{-1}=(a_hx+a_l)=a_h\Delta^{-1}x+(a_l+a_hA)\Delta^{-1} \quad \text{Equation 10}$$

Using Equation 9 in Equation 10 results in $$a(x)^{-1}=(a_hx+a_l)^{-1}=a_h(a_l^2+a_la_hA+Ba_h^2)^{-1}x+ (a_l+a_hA)(a_l^2+a_la_hA+Ba_h^2)^{-1} \quad \text{Equation 11}$$

where A and B are constant coefficients. In the module inversion module 200, A=4 and B=4, and the circuitry to implement Equation 11 can include a forward isomorphic mapper 201 to map input to composite fields, two constant multipliers 203,204 to perform a 4-bit wise multiplication operation of input by constant B, where B=4 (e.g., hex value 0x4, binary value $\{0100\}_2$). The circuitry to support Equation 11, A=4 and B=4, can also include multipliers 207,217,219 to perform 4-bit wise multiplication operations in $GF(2^4)$, squarers 205,209 to perform squaring operations in $GF(2^4)$, a multiplicative inverter 215 to perform multiplicative inversion in $GF(2^4)$, an inverse isomorphic mapper 221 to map input to $GF(2^8)$, and adders 211,213 to perform addition operations in $GF(2^4)$. An addition operation in $GF(2^4)$ corresponds to a logical bit-wise exclusive-OR (XOR) operation.

An 8-bit element a 225 in GF(256) can be input to the forward isomorphic mapper 201. The forward isomorphic mapper 201 can perform isomorphic mapping to composite fields. For example, the forward isomorphic mapper 201 can perform a map operation on the byte (e.g., input a 225) to represent the element, input a 225, in $GF(16^2)$ as a polynomial of the form $a_hx+a_l$ in $GF(2^4)$, where $a_h$ is the high-order 4-bits 230 of the input a 225 $a_l$ is the low-order 4-bits 235 of input a 225. The inverse of a in $GF(2^8)$, that is, $(a)^{-1}$ can be represented in $GF(2^4)$ by $(a_hx+a_l)^{-1}$ in Equation 10 above.

Sub-byte $a_h$ 230 can be input to squarer 205 to create result 206, and result 206 can be input to a constant multiplier 203, which multiplies the result 206 by constant coefficient B, where B=4 and is the hex value 0x4 or binary representation $\{0100\}_2$, to create result 251. In the module inversion module 200, A=4 and B=4. For A=4 and B=4, the irreducible polynomial $x^2+Ax+B=x^2+4x+4$. Sub-byte $a_h$ 230 can also be input into a second constant multiplier 204 to multiply $a_h$ 230 by constant coefficient A (e.g., A=4), which is hex value 0x4 or binary representation $\{0100\}_2$, to create result 208.

Sub-byte $a_l$ 235 can be input to a squarer 209 to create result 255. The result 208 and sub-byte $a_l$ 235 can also be input to a multiplier 207 to create result 253. The result 251, result 253, and result 255 can be input to an adder 211 to create result 257.

The result 257 can be input into a multiplicative inverter 215 to create result 259. The result 208 and sub-byte $a_l$ 235 can also be input to an adder 213 to create result 261. The result 259 and result 261 can be input to multiplier 219 to create a 4-bit result 265. The result 259 and sub-byte $a_h$ 230 can also be input to multiplier 217 to create a 4-bit result 263. The 4-bit result 263 and the 4-bit result 265 can be combined and input to an inverse isomorphic mapper 221 to create an 8-bit output 227 in GF(256).

Figure 3:
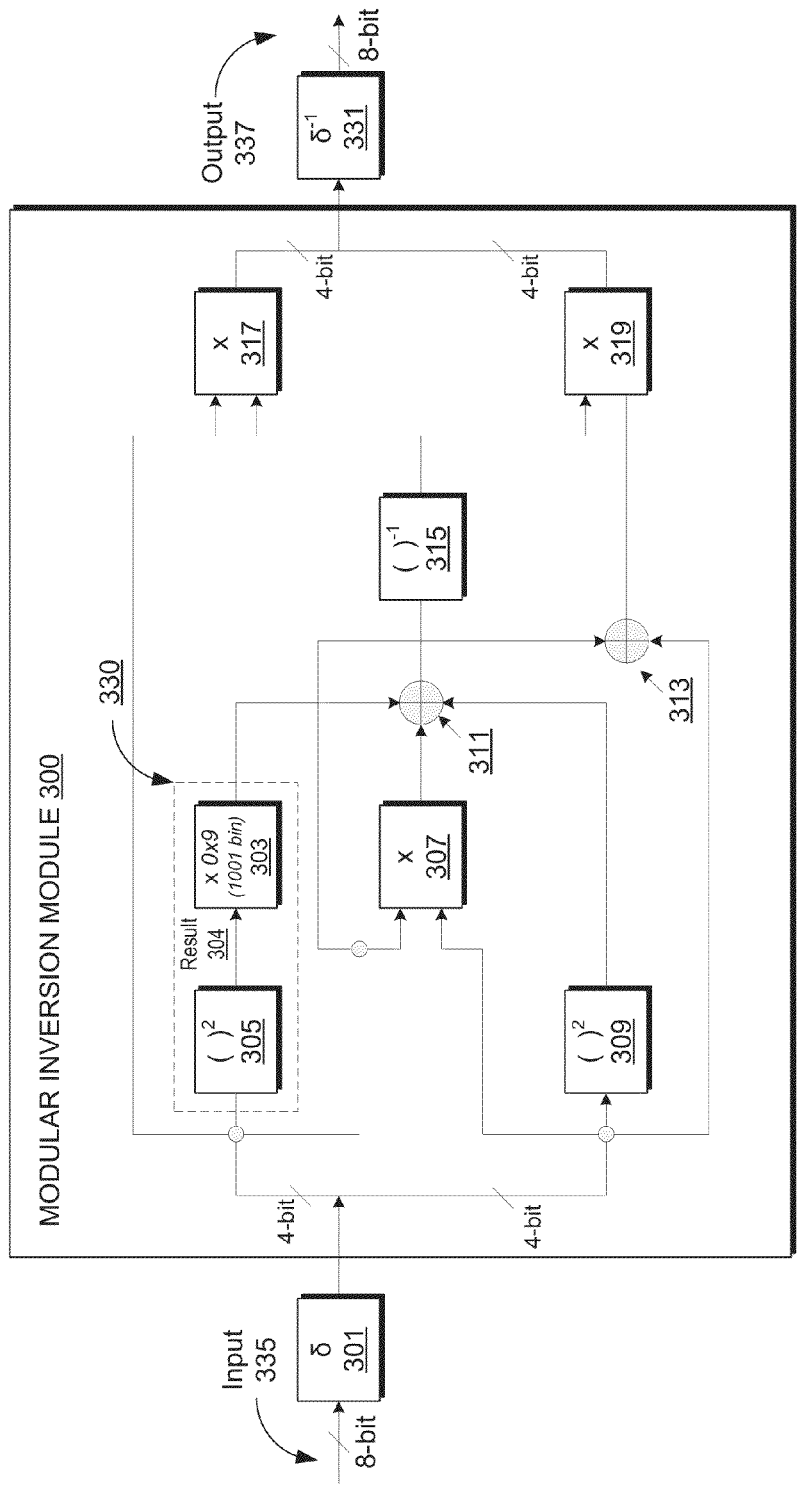
FIG. 3 is a block diagram of one embodiment for performing an inversion in GF(16) for one byte (8-bits) in the ZUC cipher data path.

In other embodiments, the modular inversion module can include circuitry to support a different set of constant coefficients A and B, which can reduce the number of circuits in the modular inversion module. For example, FIG. 3 is a block diagram illustrating an embodiment of a modular inversion module 300 that includes circuitry to support a single constant multiplier operation. The embodiment of the module inversion module 200 in FIG. 2 includes circuitry to support two constant multiplier operations.

The embodiment of the modular inversion module 300 in FIG. 3 uses coefficient constants A=1 and B=9 to avoid an additional multiplication operation and circuitry for the multiplication operation. For example, A=1 can avoid a multiplication operation in $P_{Comp}(y)=y^2+Ay+B$ since "1*y=y". The modular inversion module 300 includes circuitry for a squaring operation in $GF(2^4)$ that is performed before a multiplication operation of the coefficient constant B in $GF(2^4)$. In modular inversion module 300, B=9 and is the hex value 0x9 or binary representation $\{1001\}_2$. For example, the module inversion module 300 can include a squarer 305 and a constant multiplier 303. The circuitry 330 for the squarer 305 and the constant multiplier 303 can be arranged to implement the squaring operation performed by the squarer 305 to generate a result 304 and to input the result 304 to the constant multiplier 303. The module inversion module 300 can include a forward isomorphic mapper 301 to map 8-bit input 335 elements in GF(256) to composite fields, a constant multiplier 303 and multipliers 307,317,319 to perform a 4-bit wise multiplication operation in $GF(2^4)$, squarers 305,309 to perform squaring operations in $GF(2^4)$, adders 311,313 to perform addition operations in $GF(2^4)$, a multiplicative inverter 315 to perform multiplicative inversion in $GF(2^4)$, and an inverse isomorphic mapper 331 to map input to an output 337 in $GF(2^8)$. The addition operations in $GF(2^4)$ correspond to logical bit-wise exclusive-OR (XOR) operations.

Figure 4:
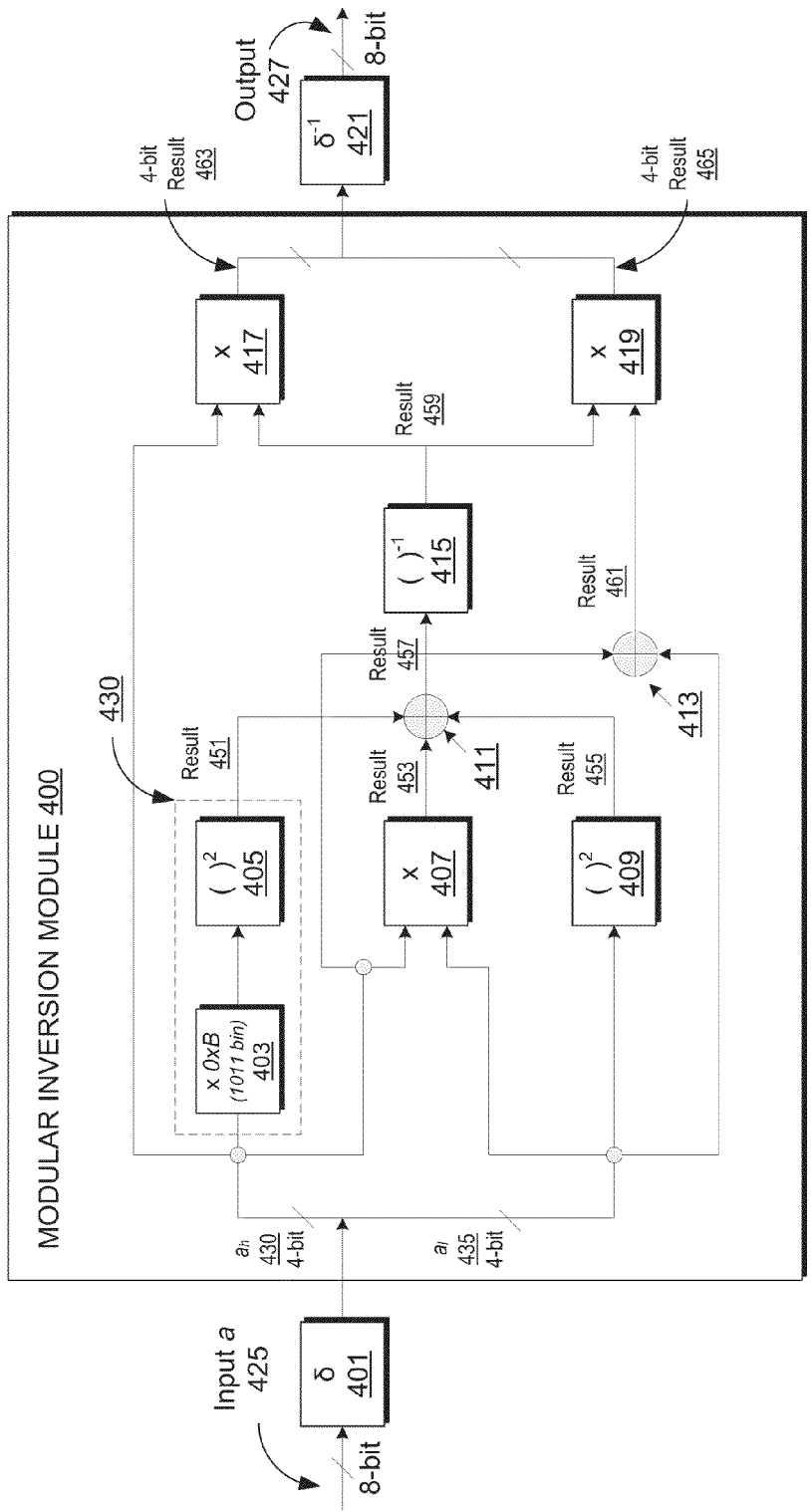
FIG. 4 is a block diagram of one embodiment for performing an inversion in GF(16) for one byte (8-bits) in the ZUC cipher data path.

In other embodiments, the modular inversion module can include circuitry that is arranged to implement functions in a different order to create more symmetrical data paths, which can improve routing and timing. FIG. 4 is a block diagram illustrating an embodiment of a modular inversion module 400 for performing an inversion in $GF(2^8)$ for an S1 substitution (8-bits) in the ZUC cipher data path using symmetrical data paths.

The modular inversion module 400 includes circuitry 403 for a constant multiplier operation that is performed before circuitry 405 performs a squaring operation. In the modular inversion module 300 in FIG. 3, the squaring operation is performed before a constant multiplier operation. The data paths starting at squarers 405 and 409 are identical, which can provide advantages, for example, in physical layout implementation, such as, and not limited to identical signal delay paths etc. In the modular inversion module 400, by moving the constant multiplier before the squaring function, B in circuitry 403 becomes hex value 0xB, also represented as binary representation $\{1011\}_2$. B=0xB as a result of taking the square root of "9". The module inversion module 400 can include a forward isomorphic mapper 401 to map 8-bit input 425 elements in GF(256) to composite fields, a constant multiplier 403 and multipliers 407,417,419 to perform a 4-bit wise multiplication operation in $GF(2^4)$, squarers 405,409 to perform squaring operations in $GF(2^4)$, adders 411,413 to perform addition operations in $GF(2^4)$, a multiplicative inverter 415 to perform multiplicative inversion in $GF(2^4)$, and an inverse isomorphic mapper 421 to map input to an output 427 in $GF(2^8)$. The addition operations in $GF(2^4)$ correspond to logical bit-wise exclusive-OR (XOR) operations.

In modular inversion module 400, an 8-bit element a 425 in GF(256) can be input to the forward isomorphic mapper 401. The forward isomorphic mapper 401 can perform isomorphic mapping to composite fields. For example, the forward isomorphic mapper 401 can perform a map operation on the byte (e.g., input a 425) to represent the element, input a 425, in $GF(16^2)$ as a polynomial of the form $a_h x + a_l$ in $GF(2^4)$, where $a_h$ is the high-order 4-bits 430 of the input a 425 $a_l$ is the low-order 4-bits 435 of input a 425.

Sub-byte $a_h$ 430 can be input to a constant multiplier 403, which multiplies sub-byte $a_h$ 430 by hex value 0xB, also represented as binary representation $\{1011\}_2$, and the result can be input into a squarer 405 to create result 451.

Sub-byte $a_l$ 435 can be input to a squarer 409 to create result 455. Sub-byte $a_h$ 430 and sub-byte $a_l$ 435 can also be input to a multiplier 407 to create result 453. The result 451, result 453, and result 455 can be input to an adder 411 to create result 457.

The result 457 can be input into a multiplicative inverter 415 to create result 459. Sub-byte $a_h$ 430 and sub-byte $a_l$ 435 can also be input to an adder 413 to create result 461. The result 459 and result 461 can be input to multiplier 419 to create a 4-bit result 465. The result 459 and sub-byte $a_h$ 430 can also be input to multiplier 417 to create a 4-bit result 463. The 4-bit result 463 and the 4-bit result 465 can be combined and input to an inverse isomorphic mapper 421 to create an 8-bit output 427 in GF(256).

For physical implementation in RTL, circuitry in the modular inversion module 400 can be grouped together, for example, to improve timing, reduce path delays, improve routing, improve data path symmetry, etc. For example, and not limited to, the constant multiplier 403 can be grouped with the square 405 to create circuitry 430.

Figure 5:
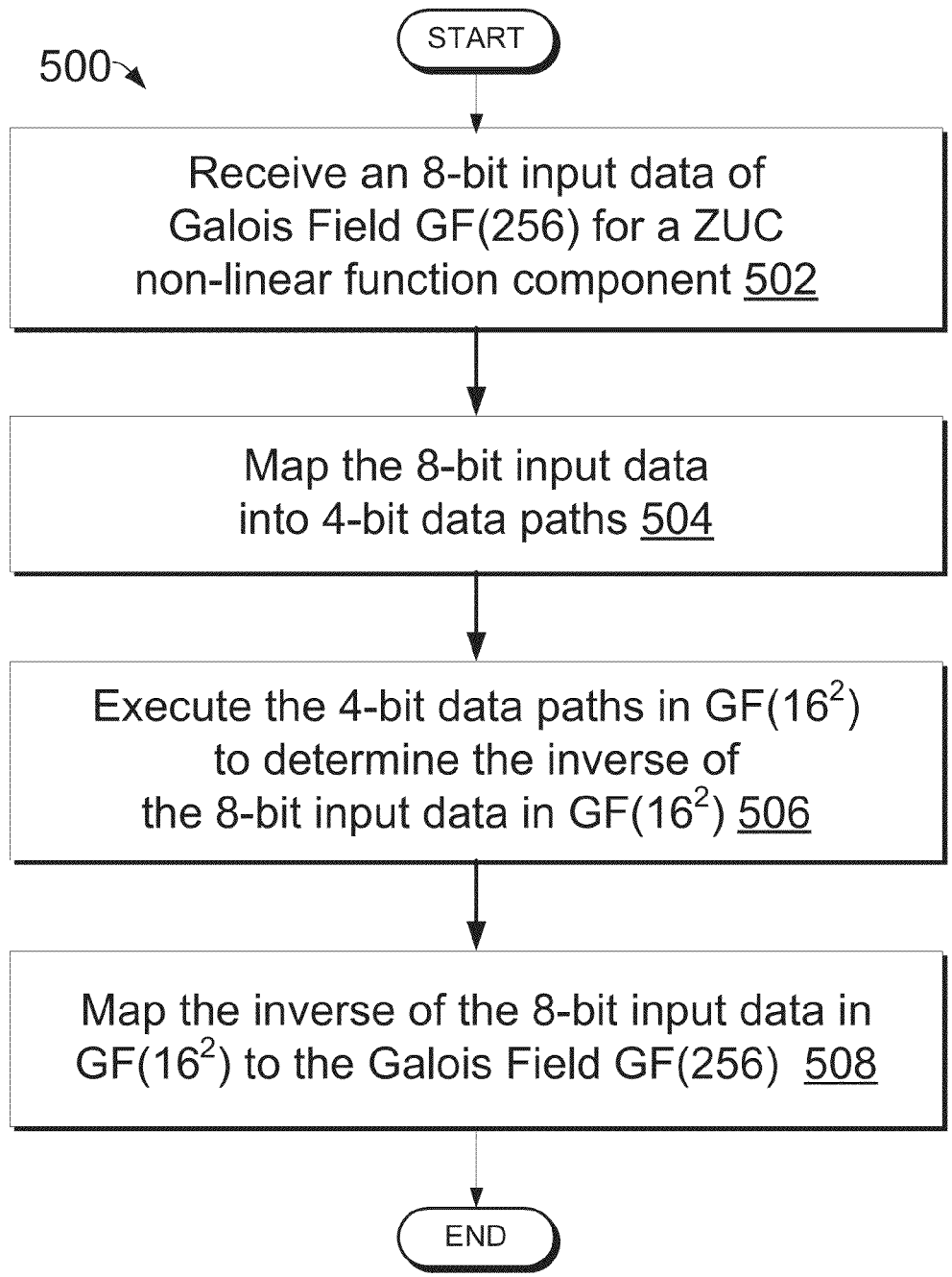
FIG. 5 is a flow diagram illustrating a method for performing an inversion in GF(16) for one byte (8-bits) in the ZUC cipher data path according to an embodiment.

FIG. 5 is a flow diagram of method 500 according to some embodiments. Method 500 may be performed by processing logic that may comprise hardware (e.g., circuitry, dedicated logic, programmable logic, microcode, etc.), software (such as instructions run on a processing device), firmware or a combination thereof. In one embodiment, method 500 is performed by a modular inversion module 105 of FIG. 1. In another embodiment, the method 500 is performed by the module inversion module 200 of FIG. 2. In another embodiment, the method 500 is performed by the module inversion module 300 of FIG. 3. In another embodiment, the method 500 is performed by the module inversion module 400 of FIG. 4.

Referring to FIG. 5, the method 500 begins by the processing logic receiving an 8-bit input data of Galois Field GF(256) for a ZUC non-linear function component (block 502). The processing logic maps the 8-bit input data into 4-bit data paths (block 504). The processing logic can use forward isomorphism to convert from GF(256) to the composite field $GF(16^2)$ for mapping the 8-bit input data into 4-bit data paths. The processing logic executes the 4-bit data paths in $GF(16^2)$ to determine the inverse of the 8-bit input data in $GF(16^2)$ (block 506). One embodiment describing execution of the 4-bit data paths in $GF(16^2)$ is described in greater detail below in conjunction with FIG. 6. At block 508, the processing logic maps the inverse of the 8-bit input data in $GF(16^2)$ to the Galois Field GF(256), and the method 500 ends. The processing logic can use inverse isomorphism to map the inverse of the 8-bit input data in $GF(16^2)$ to the Galois Field GF(256).

Figure 6:
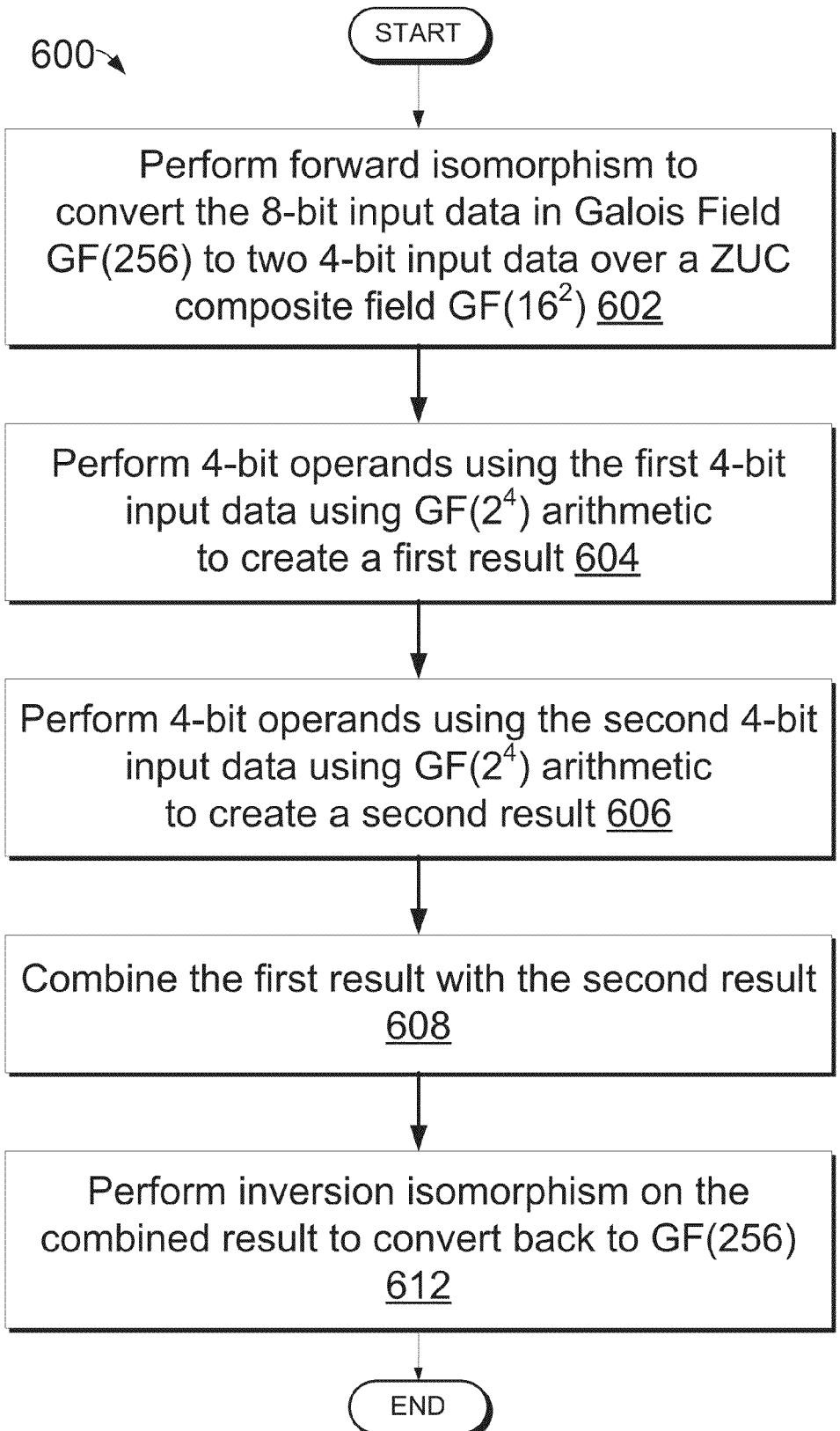
FIG. 6 is a flow diagram illustrating a method for performing an inversion in GF(16) for one byte (8-bits) in the ZUC cipher data path according to another embodiment.

FIG. 6 is a flow diagram of method 600 according to some embodiments. Method 600 may be performed by processing logic that may comprise hardware (e.g., circuitry, dedicated logic, programmable logic, microcode, etc.), software (such as instructions run on a processing device), firmware or a combination thereof. In one embodiment, method 600 is performed by a modular inversion module 105 of FIG. 1. In another embodiment, the method 600 is performed by the module inversion module 200 of FIG. 2. In another embodiment, the method 600 is performed by the module inversion module 300 of FIG. 3. In another embodiment, the method 600 is performed by the module inversion module 400 of FIG. 4.

Referring to FIG. 6, the method 600 begins by the processing logic performing forward isomorphism to convert an 8-bit input data in Galois Field GF(256) to two 4-bit input data over a ZUC composite field $GF(16^2)$ (block 602). The processing logic performs 4-bit operands using the first 4-bit input data using $GF(2^4)$ arithmetic to create a first result (block 604). For example, the processing logic executes circuitry in modular inversion module 200 in FIG. 2 to create a first 4-bit result 263.

Returning to FIG. 6, at block 606, the processing logic also performs 4-bit operands using the second 4-bit input data using $GF(2^4)$ arithmetic to create a second result. For example, the processing logic executes circuitry in modular inversion module 200 in FIG. 2 to create a second 4-bit result 265. The processing logic also combines the first result with the second result using $GF(2^4)$ arithmetic (block 608). The processing logic also performs inversion isomorphism on the combined result to convert back to GF(256) (block 610), and the method 600 ends, according to one embodiment.

In other embodiments, the processing logic uses the result from converting back to GF(256) to perform a matrix multiplication operation of the affine transform. As described above, in the ZUC algorithm, the S1 S-box uses an inversion in the field of $GF(2^8)$ coupled with an affine transformation. An affine transform can be defined as y=Ax+b, where A is a binary matrix and b is a byte represented as a vector. In the ZUC algorithm, the underlying $GF(2^8)$ finite field is defined by the binary polynomial $p(x)=x^8+x^7+x^3+x+1$. The binary polynomial is an irreducible polynomial.

In the ZUC algorithm, the binary matrix A is $$\begin{bmatrix} 0 & 1 & 1 & 1 & 1 & 0 & 0 & 1 \\ 1 & 0 & 1 & 1 & 1 & 1 & 0 & 0 \\ 1 & 1 & 0 & 1 & 0 & 1 & 1 & 0 \\ 1 & 1 & 1 & 0 & 0 & 0 & 1 & 1 \\ 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \end{bmatrix} \quad \text{Diagram 3}$$

In the ZUC algorithm, the vector b is 0x55 (hex). The byte representation for b is 0101010101. The affine transform y=Ax+b for the ZUC algorithm is $$y = \begin{bmatrix} 0 & 1 & 1 & 1 & 1 & 0 & 0 & 1 \\ 1 & 0 & 1 & 1 & 1 & 1 & 0 & 0 \\ 1 & 1 & 0 & 1 & 0 & 1 & 1 & 0 \\ 1 & 1 & 1 & 0 & 0 & 0 & 1 & 1 \\ 0 & 1 & 1 & 1 & 1 & 1 & 1 & 0 \\ 1 & 0 & 1 & 1 & 0 & 1 & 1 & 1 \\ 1 & 1 & 0 & 1 & 1 & 0 & 1 & 1 \\ 1 & 1 & 1 & 0 & 1 & 1 & 0 & 1 \end{bmatrix} \cdot x^{-1} \oplus \begin{bmatrix} 0 \\ 1 \\ 0 \\ 1 \\ 0 \\ 1 \\ 0 \\ 1 \end{bmatrix} \quad \text{Diagram 4}$$

where $x^{-1}$ is the inversion that is determined by a modular inversion module (e.g., modular inversion module 105 in FIG. 1, modular inversion module 200 in FIG. 2, modular inversion module 300 in FIG. 3, and/or modular inversion module 400 in FIG. 4).

For example, for the modular inversion module 300 in FIG. 3 and the modular inversion module 400 in FIG. 4, where A=1 and B=9, the forward isomorphic and the inverse isomorphic may be

| Fwd Isomorphic | Inv Isomorphic | Diagram 5 |
|---|---|---|
| 1 1 0 1 1 1 1 0 | 0 0 1 0 0 1 1 0 | |
| 0 0 1 1 1 0 0 0 | 0 1 0 1 0 1 0 0 | |
| 1 1 0 0 1 0 1 0 | 0 1 1 0 0 0 1 0 | |
| 1 1 1 0 0 0 0 0 | 0 0 1 0 1 0 1 0 | |
| 0 0 0 0 1 0 0 0 | 0 0 0 0 1 0 0 0 | |
| 1 0 0 1 1 0 0 0 | 1 0 0 0 1 0 1 0 | |
| 1 1 0 1 0 0 1 0 | 0 1 0 1 1 0 1 0 | |
| 1 0 0 1 1 1 1 1 | 1 1 0 1 0 1 0 1 | |
| | | |
| b b 5 c e 8 a 0 | 0 6 b 4 1 c b 0 | |
| 7 2 0 7 d 1 3 1 | 5 3 0 3 e 1 6 1 | |

The inverse isomorphic "$\delta^{-1}$" in Diagram 5 above may be determined, for example, by processing logic at block 508 in FIG. 5 and/or by processing logic at block 612 in FIG. 6. The inverse isomorphic "$\delta^{-1}$" can be merged with the binary matrix A to create $$a^T = A\delta^{-1}(a_h, a_l)^T = \begin{bmatrix} 0 & 1 & 0 & 1 & 1 & 1 & 1 & 1 \\ 1 & 1 & 1 & 0 & 1 & 0 & 0 & 0 \\ 1 & 0 & 1 & 1 & 0 & 1 & 0 & 0 \\ 1 & 1 & 0 & 0 & 1 & 0 & 0 & 1 \\ 0 & 1 & 1 & 1 & 0 & 1 & 1 & 0 \\ 0 & 0 & 1 & 1 & 1 & 1 & 0 & 1 \\ 1 & 0 & 0 & 0 & 0 & 0 & 0 & 1 \\ 0 & 0 & 1 & 1 & 1 & 0 & 0 & 0 \end{bmatrix} \begin{bmatrix} a_7 \\ a_6 \\ a_5 \\ a_4 \\ a_3 \\ a_2 \\ a_1 \\ a_0 \end{bmatrix} \quad \text{Diagram 6}$$

where $a^T$ is the merging of the inverse isomorphism $\delta^{-1}$ with binary matrix A. $a^T$ can then be added to vector b using vector addition to determine the affine transform y=Ax+b for the ZUC algorithm.

Figure 7:
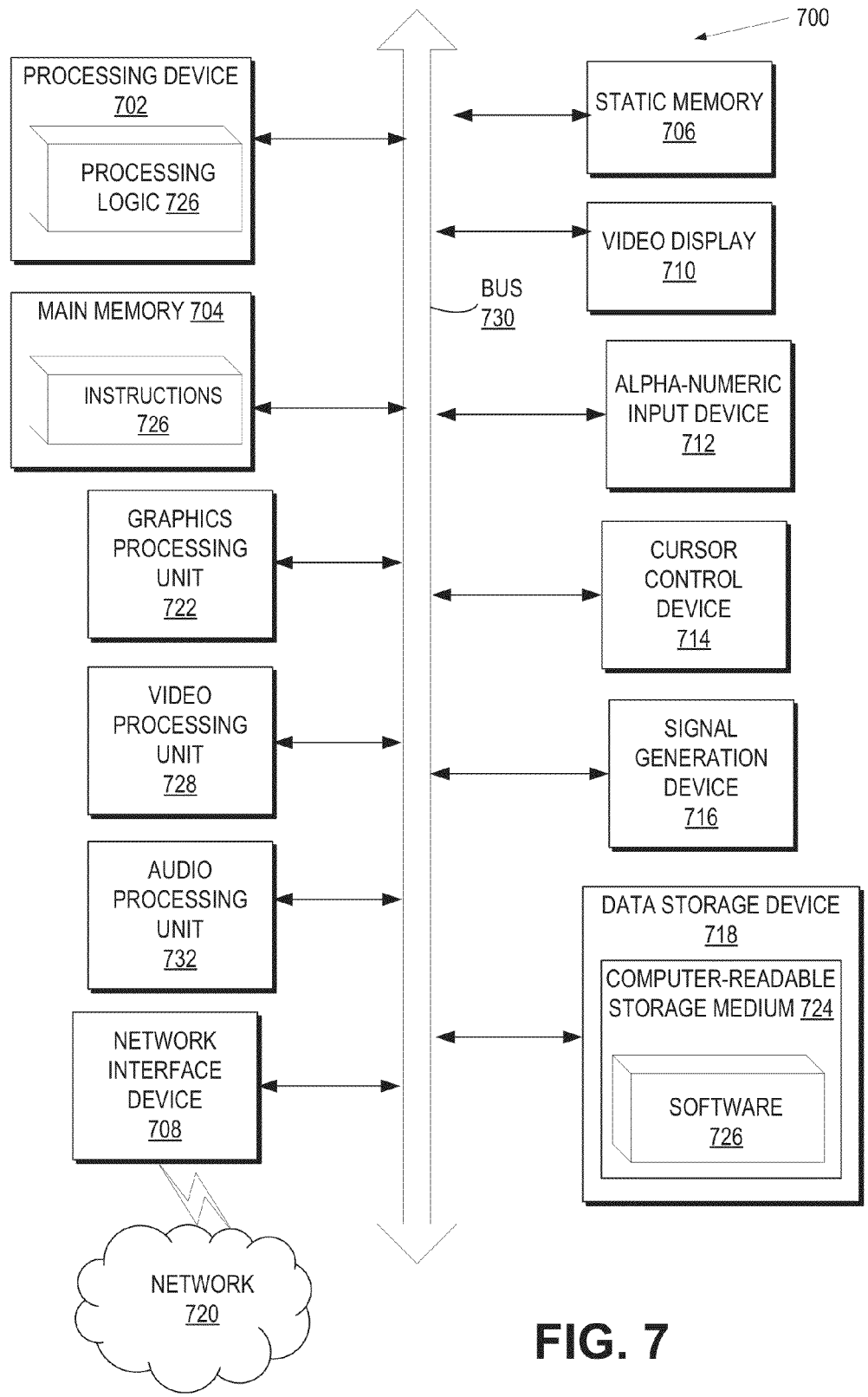
FIG. 7 illustrates a diagrammatic representation of a machine in the example form of a computer system within which a set of instructions, for causing the machine to perform any one or more of the methodologies discussed herein, may be executed.

FIG. 7 illustrates a representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or processing cores. The processing device 702 is configured to execute the processing logic 726 for performing the operations discussed herein. In one embodiment, processing device 702 is the same as computing system 100 of FIG. 1 that implements the modular inversion module 105. In another embodiment, processing device 702 implements modular inversion module 200 of FIG. 2. In another embodiment, processing device 702 implements modular inversion module 300 of FIG. 3. In another embodiment, processing device 702 implements modular inversion module 400 of FIG. 4. In another embodiment, processing device 702 implements a modular inversion module to support any combination of constant coefficients A and B in Table 1 above.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), or other peripheral devices. Furthermore, computer system 700 may include a graphics processing unit 722, a video processing unit 728, and an audio processing unit 732. In another embodiment, the computer system 700 may include a chipset (not illustrated), which refers to a group of integrated circuits, or chips, that are designed to work with the processing device 702 and controls communications between the processing device 702 and external devices. For example, the chipset may be a set of chips on a motherboard that links the processing device 702 to very high-speed devices, such as main memory 704 and graphic controllers, as well as linking the processing device 702 to lower-speed peripheral buses of peripherals, such as USB, PCI or ISA buses.

The data storage device 718 may include a computer-readable storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting computer-readable storage media.

The computer-readable storage medium 724 may also be used to store instructions 726 utilizing the modular inversion module, such as described with respect to FIG. 1, FIG. 2, FIG. 3, and FIG. 4, and/or a software library containing methods that call the above applications. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus for determining an inverse for a ZUC cipher comprising 1) a first circuit to map an 8-bit input data of a Galois field GF(256) for a 8-bit data path for a ZUC cipher non-linear function component into 4-bit data paths for the ZUC cipher non-linear function component; and 2) a plurality of circuits coupled to the first circuit to execute the 4-bit data paths in $GF(16^2)$ to determine the inverse of the 8-bit input data for the ZUC cipher non-linear function component in $GF(16^2)$ and to map the inverse in $GF(16^2)$ to the Galois field GF(256).

In Example 2, the first circuit of Example 1 can optionally comprise 1) circuitry to perform forward isomorphism to convert the 8-bit input data from GF(256) to 4-bit inputs over a ZUC composite field $GF(16^2)$.

In Example 3, the plurality of circuits of Example 1 can optionally comprise circuitry to perform a plurality of 4-bit operands on 4-bit inputs using $GF(2^4)$ arithmetic and coefficients A and B for a second degree field polynomial, the second degree field polynomial comprising $x^2+Ax+B$, the coefficients A and B comprising elements in GF(16).

In Example 4, the subject matter of Example 3 can optionally comprise a coefficient A of four and a coefficient B of four.

In Example 5, the subject matter of Example 3 can optionally comprise a coefficient A of one and the coefficient B of nine.

In Example 6, the plurality of 4-bit operands of Example 5 can optionally comprise multiplying one of the 4-bit inputs by hex value 0xB in $GF(2^4)$ to create a result; and squaring the result in $GF(2^4)$.

In Example 7, the plurality of circuits of Example 6 can optionally comprise circuitry for multiplying one of the 4-bit inputs by hex value 0xB in $GF(2^4)$ to create the result and circuitry for squaring the result in $GF(2^4)$ that is grouped together.

In Example 8, the plurality of 4-bit operands of Example 6 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 9, the plurality of 4-bit operands of Example 5 can optionally comprise squaring one of the 4-bit inputs in $GF(2^4)$ to create a result; and multiplying the result by hex value 0x9 in $GF(2^4)$.

In Example 10, the plurality of circuits of Example 9 can optionally comprise circuitry for squaring one of the 4-bit inputs to create the result and circuitry for multiplying the result by hex value 0x9 in $GF(2^4)$ that is grouped together.

In Example 11, the plurality of 4-bit operands of Example 9 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 12, the subject matter of Example 1 can optionally comprise a Galois field GF(256) that is defined by a degree eight irreducible polynomial comprising $p(x)=x^8+x^7+x^3+x+1$.

Various embodiments may have different combinations of the operational features described above. For instance, all optional features of the apparatus described above may also be implemented with respect to the method or process described herein and specifics in the examples may be used anywhere in one or more embodiments.

Example 13 is an method for determining an inverse for a ZUC cipher comprising 1) mapping, by an integrated circuit, an 8-bit input data of a Galois field GF(256) for a 8-bit data path for a ZUC cipher non-linear function component into 4-bit data paths for the ZUC cipher non-linear function component; 2) executing the 4-bit data paths in $GF(16^2)$ to determine the inverse of the 8-bit input data for the ZUC cipher non-linear function component in $GF(16^2)$; and 3) mapping the inverse in $GF(16^2)$ to the Galois field GF(256).

In Example 14, the mapping of Example 13 can optionally comprise performing forward isomorphism to convert the 8-bit input data from GF(256) to 4-bit inputs over a ZUC composite field $GF(16^2)$.

In Example 15, the executing the 4-bit data paths in $GF(16^2)$ of Example 13 can optionally comprise performing a plurality of 4-bit operands on 4-bit inputs using $GF(2^4)$ arithmetic and 4-bit coefficients A and B for a second degree field polynomial, the second degree field polynomial comprising $x^2+Ax+B$, the coefficients A and B comprising elements in GF(16).

In Example 16, the subject matter of Example 15 can optionally comprise a coefficient A of four and a coefficient B of four.

In Example 17, the subject matter of Example 15 can optionally comprise a coefficient A of one and the coefficient B of nine.

In Example 18, the plurality of 4-bit operands of Example 17 can optionally comprise multiplying one of the 4-bit inputs by hex value 0xB in $GF(2^4)$ to create a result; and squaring the result in $GF(2^4)$.

In Example 19, the plurality of circuits of Example 18 can optionally comprise circuitry for multiplying one of the 4-bit inputs by hex value 0xB in $GF(2^4)$ to create the result and circuitry for squaring the result in $GF(2^4)$ that is grouped together.

In Example 20, the plurality of 4-bit operands of Example 18 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 21, the plurality of 4-bit operands of Example 17 can optionally comprise squaring one of the 4-bit inputs in $GF(2^4)$ to create a result; and multiplying the result by hex value 0x9 in $GF(2^4)$.

In Example 22, the plurality of circuits of Example 21 can optionally comprise circuitry for squaring one of the 4-bit inputs to create the result and circuitry for multiplying the result by hex value 0x9 in $GF(2^4)$ that is grouped together.

In Example 23, the plurality of 4-bit operands of Example 21 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 24, the subject matter of Example 13 can optionally comprise a Galois field GF(256) that is defined by a degree eight irreducible polynomial comprising $p(x)=x^8+x^7+x^3+x+1$.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 25 is a non-transitory, computer-readable storage medium including instructions that, when executed by a computing system, cause the computing system to perform the method of Examples 13-18, 20-21, and 24.

Example 26 is a system for determining an inverse for a ZUC cipher comprising 1) a memory to store data and instructions; and 2) a processor coupled to the memory to execute the instructions to: a) map an 8-bit input data of a Galois field GF(256) for a 8-bit data path for a ZUC cipher non-linear function component into 4-bit data paths for the ZUC cipher non-linear function component; b) execute the 4-bit data paths in $GF(16^2)$ to determine the inverse of the 8-bit input data for the ZUC cipher non-linear function component in $GF(16^2)$; and c) map the inverse in $GF(16^2)$ to the Galois field GF(256).

In Example 27, the mapping of Example 26 can optionally comprise performing forward isomorphism to convert the 8-bit input data from GF(256) to 4-bit inputs over a ZUC composite field $GF(16^2)$.

In Example 28, the executing the 4-bit data paths in $GF(16^2)$ of Example 26 can optionally comprise performing a plurality of 4-bit operands on 4-bit inputs using $GF(2^4)$ arithmetic and 4-bit coefficients A and B for a second degree field polynomial, the second degree field polynomial comprising $x^2+Ax+B$, the coefficients A and B comprising elements in GF(16).

In Example 29, the subject matter of Example 28 can optionally comprise a coefficient A of four and a coefficient B of four.

In Example 30, the subject matter of Example 28 can optionally comprise a coefficient A of one and the coefficient B of nine.

In Example 31, the plurality of 4-bit operands of Example 30 can optionally comprise multiplying one of the 4-bit inputs by hex value 0xB in $GF(2^4)$ to create a result; and squaring the result in $GF(2^4)$.

In Example 32, the plurality of circuits of Example 31 can optionally comprise circuitry for multiplying one of the 4-bit inputs hex value 0xB in $GF(2^4)$ to create the result and circuitry for squaring the result in $GF(2^4)$ that is grouped together.

In Example 33, the plurality of 4-bit operands of Example 31 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 34, the plurality of 4-bit operands of Example 30 can optionally comprise squaring one of the 4-bit inputs in $GF(2^4)$ to create a result; and multiplying the result by hex value 0x9 in $GF(2^4)$.

In Example 35, the plurality of circuits of Example 34 can optionally comprise circuitry for squaring one of the 4-bit inputs to create the result and circuitry for multiplying the result by hex value 0x9 in $GF(2^4)$ that is grouped together.

In Example 36, the plurality of 4-bit operands of Example 34 can optionally comprise at least one of: at least one other squaring operation in $GF(2^4)$, at least one other multiplication operation in $GF(2^4)$, at least one 4-bit bit-wise exclusive-OR (XOR) operation, or an inversion operation in $GF(2^4)$.

In Example 37, the subject matter of Example 26 can optionally comprise a Galois field GF(256) that is defined by a degree eight irreducible polynomial comprising $p(x)=x^8+x^7+x^3+x+1$.

Example 38 is an apparatus for determining an inverse for a ZYC cipher comprising 1) means for mapping an 8-bit input data of a Galois field GF(256) for a 8-bit data path for a ZUC cipher non-linear function component into 4-bit data paths for the ZUC cipher non-linear function component; 2) means for executing the 4-bit data paths in $GF(16^2)$ to determine the inverse of the 8-bit input data for the ZUC cipher non-linear function component in $GF(16^2)$; and 3) means for mapping the inverse in $GF(16^2)$ to the Galois field GF(256).

In Example 39, the subject matter of Example 38 can optionally comprise means for performing a plurality of 4-bit operands on 4-bit inputs using $GF(2^4)$ arithmetic and 4-bit coefficients A and B for a second degree field polynomial, the second degree field polynomial comprising $x^2+Ax+B$, the coefficients A and B comprising elements in GF(16).

In Example 40, the subject matter of Example 39 can optionally comprise a coefficient A of one and the coefficient B of nine.

In Example 41, the plurality of 4-bit operands of Example 40 can optionally comprise means for multiplying one of the 4-bit inputs by hex value 0xB in $GF(2^4)$ to create a result; and means for squaring the result in $GF(2^4)$.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "mapping," "executing," "performing," "multiplying," "squaring," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
   a first circuit to map an 8-bit input data of a Galois field GF(256) for an 8-bit data path for a ZUC cipher non-linear function component into sub-bytes for 4-bit data paths for the ZUC cipher non-linear function component, wherein each sub-byte is a 4-bit input; and
   a plurality of circuits coupled to the first circuit to multiply one of the 4-bit inputs by a first hex value to create a first result and square the first results in $GF(2^4)$, or square one of the 4-bit inputs in $GF(2^4)$ to create a second result and multiply the second result by a second hex value, to determine the inverse of the 8-bit input data for the ZUC cipher non-linear function component in $GF(16^2)$ and to map the inverse in $GF(16^2)$ to the Galois field GF(256).

2. The apparatus circuit of claim 1, wherein the first circuit comprises:
   a forward isomorphism mapper circuit to convert the 8-bit input data from GF(256) to the 4-bit inputs over a ZUC composite field $GF(16^2)$.

3. The apparatus circuit of claim 1, wherein the plurality of circuits
   executes a plurality of 4-bit operands on the 4-bit inputs using $GF(2^4)$ arithmetic and coefficients A and B for a second degree field polynomial, the second degree field polynomial comprising $x^2+Ax+B$, the coefficients A and B comprising elements in GF(16).

4. The apparatus of claim 3, wherein the coefficient A is four and the coefficient B is four.

5. The apparatus of claim 3, wherein the coefficient A is one and the coefficient B is nine.

6. The apparatus of claim 1, wherein the
   first hex value is 0xB.

7. The apparatus of claim 6, wherein the plurality of circuits coupled to the first circuit comprises:
   a constant multiplier circuit to multiply one of the 4-bit inputs by first hex value 0xB in $GF(2^4)$ to create the first result; and
   a squarer circuit to square the first result in $GF(2^4)$.

8. The apparatus of claim 1, wherein the
   second hex value is 0x9.

9. The apparatus of claim 1, wherein the Galois field GF(256) is defined by a degree eight irreducible polynomial comprising $p(x)=x^8+x^7+x^3+x+1$.

10. A method comprising:
    mapping, by an integrated circuit, an 8-bit input data of a Galois field GF(256) for a 8-bit data path for a ZUC cipher non-linear function component into sub-bytes for 4-bit data paths for the ZUC cipher non-linear function component, wherein each sub-byte is a 4-bit input;
    multiplying one of the 4-bit inputs by a first hex value to create a first result and squaring the first result in $GF(2^4)$, or squaring one of the 4-bit inputs in $GF(2^4)$ to create a second result and multiplying the second result by a second hex value, to determine the inverse of the 8-bit input data for the ZUC cipher non-linear function component in $GF(16^2)$; and
    mapping the inverse in $GF(16^2)$ to the Galois field GF(256).

11. The method of claim 10, wherein mapping the 8-bit input data into the sub-bytes for the 4-bit data paths for the ZUC cipher non-linear function component comprises:
    performing forward isomorphism to convert the 8-bit input data from GF(256) to the 4-bit inputs over a ZUC composite field $GF(16^2)$.

12. The method of claim 10, further comprising:
    performing a plurality of 4-bit operands on the 4-bit inputs using $GF(2^4)$ arithmetic and 4-bit coefficients A and B for a second degree field polynomial, the second degree field polynomial comprising $x^2+Ax+B$, the coefficients A and B comprising elements in GF(16).

13. The method of claim 12, wherein the coefficient A is four and the coefficient B is four.

14. The method of claim 12, wherein the coefficient A is one and the coefficient B is nine.

15. The method of claim 14, wherein the
    first hex value is 0xB.

16. The method of claim 15, further comprising execution of at least one of:
    a squaring operation in $GF(2^4)$, a multiplication operation in $GF(2^4)$, a 4-bit bit-wise exclusive-OR (XOR) operation, or an inversion operation in $GF(2^4)$.

17. The method of claim 10, wherein the Galois field GF(256) is defined by a degree eight irreducible polynomial comprising $p(x)=x^8+x^7+x^3+x+1$.

18. A non-transitory, computer-readable storage medium including instructions that, when executed by a computing system, cause the computing system to perform operations comprising:
    mapping an 8-bit input data of a Galois field GF(256) for a 8-bit data path for a ZUC cipher non-linear function component into sub-byte for 4-bit data paths for the ZUC cipher non-linear function component, wherein each sub-byte is a 4-bit input;
    multiplying one of the 4-bit inputs by a first hex value to create a first result and squaring the first result in $GF(2^4)$, or squaring one of the 4-bit inputs to $GF(2^4)$ to create a second result and multiplying the second result by a second hex value, to determine the inverse of the 8-bit input data for the ZUC cipher non-linear function component in $GF(16^2)$; and
    mapping the inverse in $GF(16^2)$ to the Galois field GF(256).

19. The storage medium of claim 18, wherein mapping the 8-bit input data into the sub-bytes for the 4-bit data paths for the ZUC cipher non-linear function component comprises:
    performing forward isomorphism to convert the 8-bit input data from GF(256) to the 4-bit inputs over a ZUC composite field $GF(16^2)$.

20. The storage medium of claim 18, further comprising:
    performing a plurality of 4-bit operands on the 4-bit inputs using $GF(2^4)$ arithmetic and 4-bit coefficients A and B for a second degree field polynomial, the second degree field polynomial comprising $x^2+Ax+B$, the coefficients A and B comprising elements in GF(16).

21. The storage medium of claim 20, wherein the coefficient A is four and the coefficient B is four.

22. The storage medium of claim 20, wherein the coefficient A is one and the coefficient B is nine.

23. The storage medium of claim 18, wherein the Galois field GF(256) is defined by a degree eight irreducible polynomial comprising $p(x)=x^8+x^7+x^3+x+1$.

24. A system for determining an inverse for a ZUC cipher comprising:
   a memory to store data and instructions; and
   a processor coupled to the memory to execute the instructions to:
      map an 8-bit input data of a Galois field GF(256) for a 8-bit data path for a ZUC cipher non-linear function component into sub-bytes for 4-bit data paths for the ZUC cipher non-linear function component, wherein each sub-byte is a 4-bit input;
      multiply one of the 4-bit inputs by a first hex value to create a first result and square the first in GF($2^4$), or square one of the 4-bit inputs in GF($2^4$) to create a second result and multiply the second result by a second hex value, to determine the inverse of the 8-bit input data for the ZUC cipher non-linear function component in GF($16^2$); and
      map the inverse in GF($16^2$) to the Galois field GF(256).

25. The system of claim 24, wherein the processor is further to;
   perform a plurality of 4-bit operands on the 4-bit inputs using GF($2^4$) arithmetic and 4-bit coefficients A and B for a second degree field polynomial, the second degree field polynomial comprising $x^2+Ax+B$, the coefficients A and B comprising elements in GF(16), the coefficient A comprising one and the coefficient B comprising nine.

* * * * *